Nov. 7, 1933.  G. CAMILLI  1,934,484
CAMERA
Filed Jan. 31, 1931
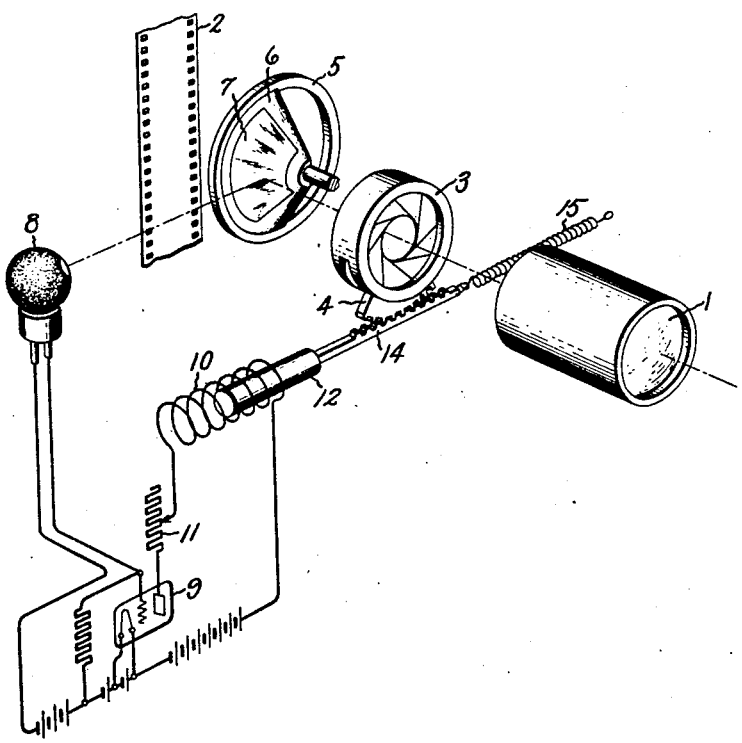
Inventor:
Guglielmo Camilli,
by Charles E. Muller
His Attorney.

Patented Nov. 7, 1933

1,934,484

UNITED STATES PATENT OFFICE 1,934,484

CAMERA

Guglielmo Camilli, Pittsfield, Mass., assignor to General Electric Company, a corporation of New York Application January 31, 1931. Serial No. 512,703

2 Claims. (Cl. 88—16)

My invention relates to cameras having means such as a diaphragm for varying the amount of light admitted to the light sensitive member thereof. It is the object of my invention to provide such a camera with means for automatically controlling the light varying means in accordance with the illumination of the field of view of the camera.

My invention will be better understood from the following description taken in connection with the accompanying drawing, and its scope will be pointed out in the appended claims.

In the single figure of the drawing which illustrates one embodiment of my invention in the form of a motion picture camera, the lens 1 forms on the light sensitive member or film 2 the image of the view or object being photographed. Adjacent the lens 1 is the diaphragm 3 which is shown as an iris diaphragm, such being the form usually employed, having an operating portion 4 which, in the present case, is in the form of a gear segment. In the path of light rays admitted by the diaphragm is the rotatable shutter 5 which in the present case is shown having one transparent sector and one opaque sector. The construction thus far described is that commonly employed in motion picture cameras and is well understood by those skilled in the art; the shutter serving to permit the exposure of the film only during those periods when the film is stationary. The opaque sector 6 of the shutter is shown as conical in formation, a portion of the sector being covered by the mirror 7. Arranged in such a position that it receives the light reflected by the mirror 7 is the photo-electric cell 8, to which is connected a suitable amplifier, for example, the thermionic amplifier diagrammatically illustrated at 9, the output of which amplifier is employed to control the setting of the diaphragm 3. Various means may be employed to accomplish this control. In the drawing I have illustrated the solenoid 10 which is arranged in the plate circuit of the amplifier including a variable resistance 11. The core 12 which is mounted to move freely in and out of the solenoid 10 connects with the rack 14 meshing with the gear segment 4. Attached to the end of the rack 14 is the return spring 15.

In the use of the apparatus, at each revolution of the shutter a flash of light similar to that by which the film is exposed is reflected into the photo-electric cell and the resulting amplified current causes the core 12 of the solenoid to take up a definite position in accordance with the light intensity received by the cell. The diaphragm is thus automatically set in accordance with the intensity of light coming from the view being photographed. It will be understood that the apparatus is suitably calibrated such that no manual adjustment of the diaphragm is necessary to bring about the proper exposure of the film.

In the interest of greater clearness and to avoid unnecessary complication in the drawing, I have purposely omitted certain well known features of the camera, such for example as the supports for the various parts illustrated, the light tight housing and the apparatus for moving the shutter and for producing an intermittent movement of the film. I have also purposely omitted any showing of the manner of supporting and enclosing the photo-electric cell and of supporting the core 12 and connected rack 14.

I have chosen the particular embodiment described above as illustrative of my invention and it will be apparent that various other modifications may be made without departing from the spirit and scope of my invention.

What I claim as new and desire to secure by Letters Patent of the United States, is:

1. In combination, a camera having a diaphragm, means for intermittently intercepting the light admitted by said diaphragm a photo-electric device, said light intercepting means including a rotatably mounted mirror arranged to reflect into said device light admitted by the diaphragm and means connected with said device for varying the setting of the diaphragm.

2. A motion picture camera having a lens, a diaphragm and a shutter, a photo-electric device, a mirror on the shutter arranged to reflect into the device light imaged by the lens and admitted by the diaphragm, and electro-magnetic means controlled by the device for varying the setting of the diaphragm.

GUGLIELMO CAMILLI.